United States Patent

[11] 3,537,354

[72] Inventor Benjamin A. Veazey
   Bletchley, England
[21] Appl. No. 772,123
[22] Filed Oct. 31, 1968
[45] Patented Nov. 3, 1970
[73] Assignee The Lapointe Machine Tool Company
   Limited
   Otterspool, Watford-by-Pass, Watford,
   Hertfordshire, England
   a British Company

[54] SURFACE BROACHING MACHINES
   12 Claims, 11 Drawing Figs.
[52] U.S. Cl. .................................................. 90/91
[51] Int. Cl. ............................................ B23d 41/04
[50] Field of Search .......................... 90/92, 91, 93, 63, 43

[56] References Cited
   UNITED STATES PATENTS
   1,684,140 9/1928 Perkins et al. ................ 90/92
   2,251,154 7/1941 Nenninger et al. ........... 90/63
   FOREIGN PATENTS
   152,370 1962 U.S.S.R. ....................... 90/92

Primary Examiner—Gil Weidenfeld
Attorney—Roberts, Cushman & Grover

ABSTRACT: A machine for broaching nonplanar surfaces on workpieces, in which a plurality of broach bodies resiliently secured to the tool slide and carrying teeth, the pitch of which is greater than the length of the surface to be machined, are reciprocal relative to the tool slide towards and away from a workpiece on the work fixture by cooperating cam and follower means on the broach bodies and the work fixture respectively.

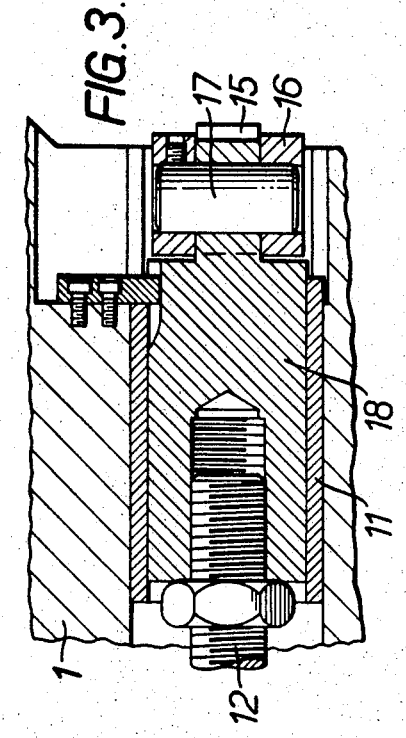
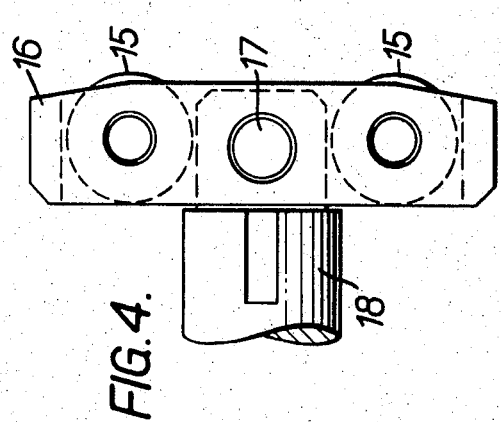
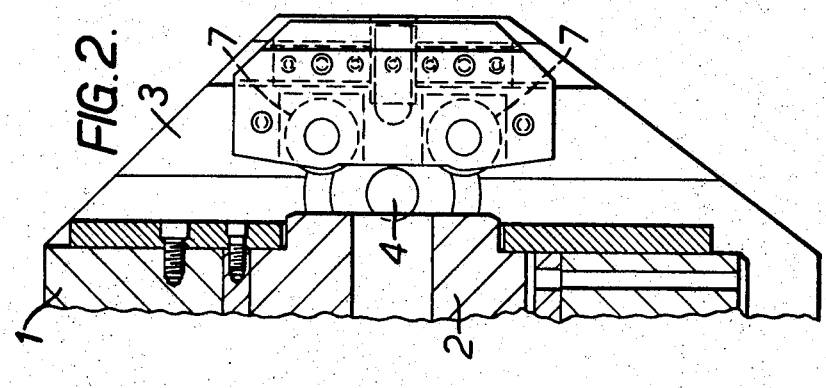

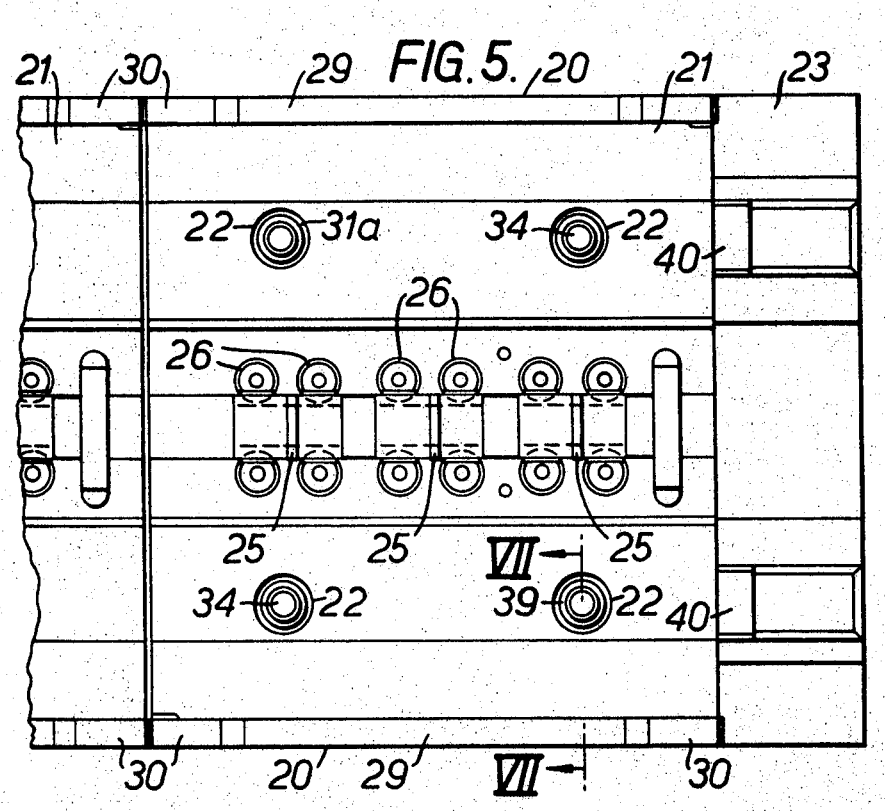
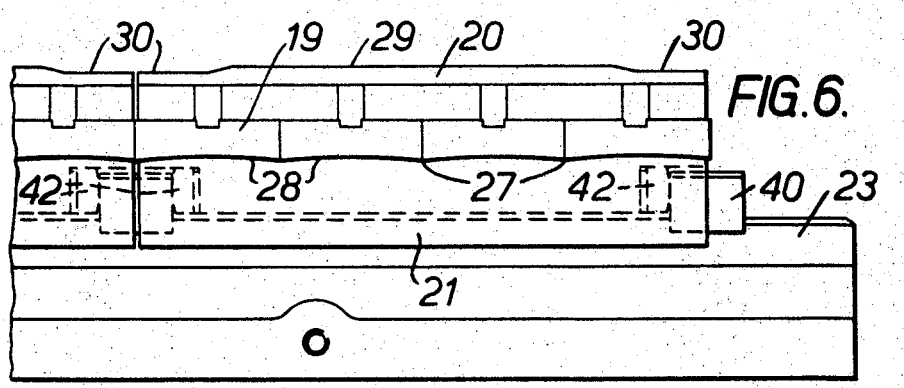

SURFACE BROACHING MACHINES

This invention relates to the surface-broaching of nonplanar surfaces on workpieces and its object is to provide a machine which will broach such surfaces in a single operation.

To this end, according to the invention, there is provided a surface-broaching machine comprising a tool slide operating in a straight line, a broach body resiliently secured to said tool slide and carrying teeth the pitch of which is greater than the length of the surface to be machined, a work fixture upon which a workpiece can be clamped in fixed relation to said tool slide, and cooperating means on said work fixture and said broach body for reciprocating said body in a plane transverse to the plane of movement of said tool slide in controlled relation to the movement of each successive tooth past a workpiece on said fixture.

In a preferred form of the invention the broach body carries a vertically extending cam track for engagement with cam follower means on the work fixture.

A machine constructed in accordance with the invention is illustrated in the accompanying drawings in which:

FIG. 2 is a vertical section on an enlarged scale, through the forward end of the work fixture;

FIGS. 3 and 4 are a horizontal section and an elevation, on an enlarged scale of an alternative form of roller mounting on the fixture;

FIGS. 5 and 6 are a front and side elevation respectively, on an enlarged scale, of the upper end of the tool slide;

The main elements of the machine are of conventional design and will not, therefore, be described in detail.

Figure 1:
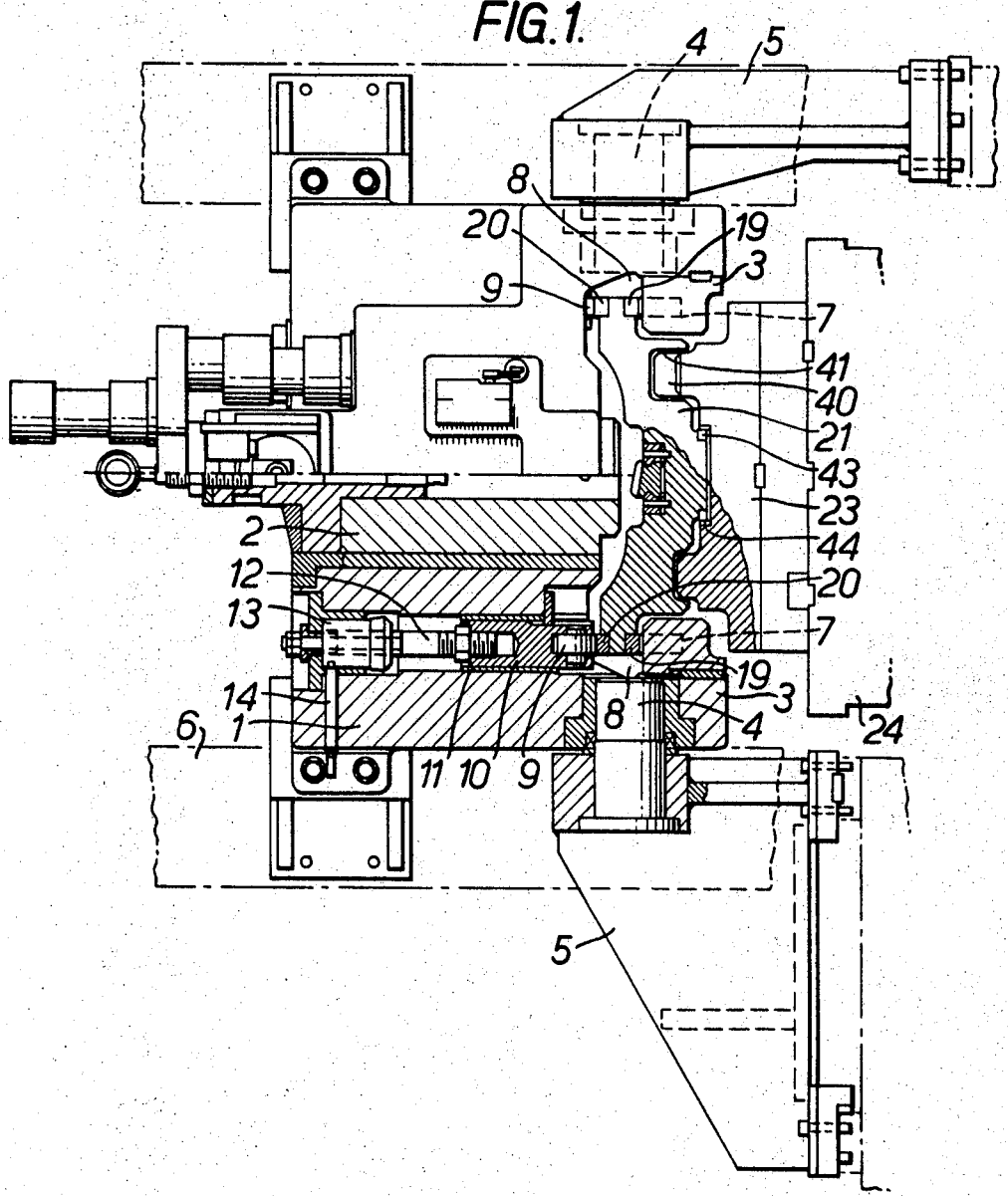
FIG. 1 is a view partly in plan and partly in horizontal section of the work fixture and part of the tool slide of the machine.
Figure 8:
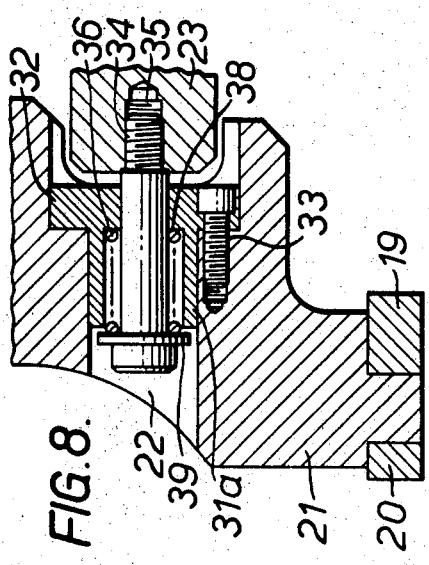
FIG. 8 is a section, similar to FIG. 7, showing an alternative connection between a broach body and the tool slide.
Figure 7:
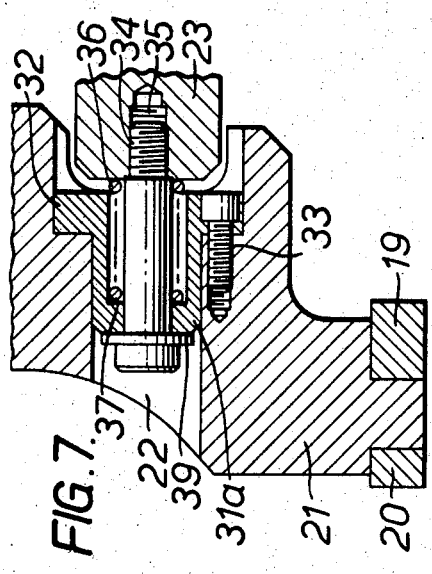
FIG. 7 is a section, on the line VII—VII of FIG. 5.
Figure 9:
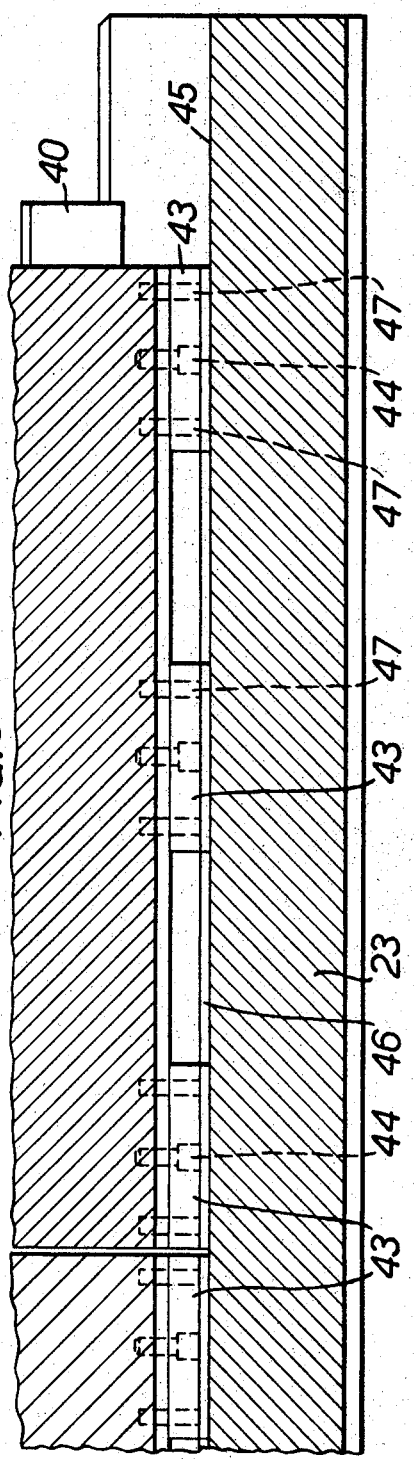
FIG. 9 is a vertical section, on an enlarged scale, through the junctions between the broach bodies and the tool slide at a point near the vertical center line of the machine.
Figure 10:
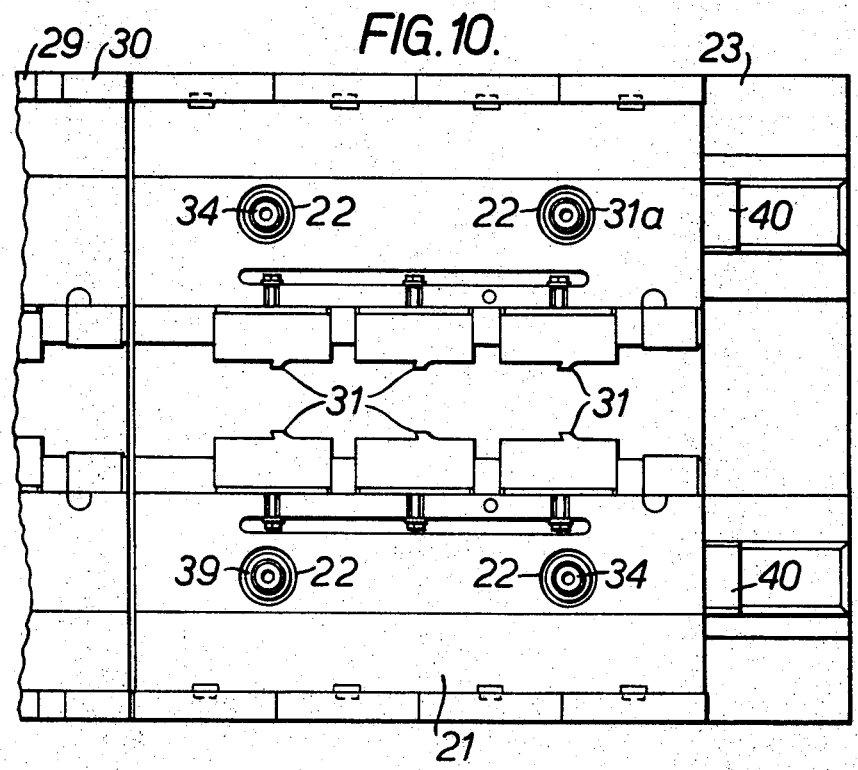
FIGS. 10 and 11 are views similar to FIGS. 5 and 6 showing an alternative form of broach body.
Figure 11:
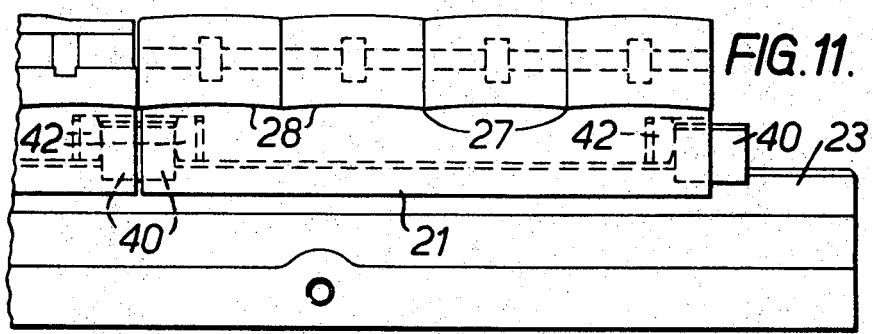

A work fixture 1 having a central shuttle 2 in which a workpiece (not shown) can be hydraulically clamped in conventional manner is provided on each side with forward extensions 3 which are pivotally mounted at 4 in side members 5 of a fixed frame 6. Rotatably mounted in each forward extension 3 is a pair of rollers 7 which project rearwardly into a gap 8 between each extension and the forward end of the fixture 1. Projecting forwardly into the gaps 8 opposite the rollers 7 are rollers 9 rotatably mounted in carriers 10 slidably arranged in sleeves 11 and connected by rods 12 to plungers of hydraulic reaction cylinders 13 supplied with fluid through standpipes 14 from a source (not shown). Pressure supplied to the cylinders 13 acting against the inner ends of the rods 12 located within the cylinders yieldably holds the rollers 9 against the pathways 20. In a modification each roller 9 may be replaced by a pair of rollers 15 (FIGS. 3 and 4) rotatably mounted in a yoke 16 which is pivotally mounted at 17 on the forward end of a carrier 18 which is connected to the cylinder 13 in the same manner as each carrier 10. The rollers 7 and the rollers 9 or 15 engage cam tracks 19 and roller pathways 20 respectively provided on each of a vertical series of broach bodies 21 resiliently secured to a subbase 23 which is rigidly secured to a tool slide 24 vertically reciprocable in a part (not shown) of the machine frame 6. Yielding engagement of the rollers 9 with the pathways 20 causes the broach body 21 to move in and out relative to the work in the work holder in accordance with the profiles of the cam tracks 19. As shown in FIG. 5, each broach body 21 carries three broach teeth 25 secured thereto by plug clamps 26 and as shown in FIG. 6 a peak 27 of each cam track registers with a tooth 25 and a trough 28 occurs between adjacent teeth. Each roller pathway 20 is formed with a plateau portion 29 coextensive with the broach teeth 25 and a dwell portion 30 at the upper and lower end of each broach body. In the modification shown in FIGS. 10 and 11 each broach body 21 is provided with three pairs of broach teeth 31 each pair of which is arranged to act simultaneously on opposite sides of a workpiece. In this construction also the peaks 27 of each cam track coincide with pairs of the teeth and the troughs 28 occur between adjacent pairs of teeth. In this case also each roller pathway on the uppermost broach body is provided with the same configuration as each cam track. As shown in FIGS. 5, 6, 11 and 12 each broach body 21 is formed with apertures 22 for the receipt of the means shown in either FIG. 7 or FIG. 8 for resiliently connecting the broach body to the subbase 23. Each connecting means comprises a bush 31a which enters and aperture 22 and is provided with a flange 32 which is secured to the broach body by screws 33, a shoulder screw 34 which enters a threaded aperture 35 in the subbase 23 and a compression spring 36. In the form shown in FIG. 7 the spring 36 acts between a shoulder 37 on the bush 31a and the surface of the subbase 23, whereas in the form shown in FIG. 8 the spring acts between a shoulder 38 on the bush and a washer 39 on the screw 34. The subbase 23 is provided at intervals with stop blocks 40 which project into recesses 41 formed at the upper and lower ends of each broach body 21 and engage radius blocks 42 on each broach body. Each broach body is also provided with radius guides 43 engaging surfaces 44 on the subbase 23 and secured to the broach body by screws 44 (FIG. 9). Interposed between the guides 43 and the surface 45 of the subbase 23 is a pad 46 which is secured to each broach body by screws 47 passing through the guides 43.

During the working stroke of the tool slide 24 each broach body, in its passage past a workpiece secured on the fixture 1 is individually reciprocated towards and away from the workpiece in accordance with the profile of the cam tracks 19 to provide the desired form of cut on the workpiece and the body is maintained in a correct upright position relative to the workpiece and the subbase by the engagement between the radius members 42 and 43 on the block and the cooperating surfaces on the subbase.

I claim:

1. A surface-broaching machine comprising a tool slide operating in a straight line, a broach body resiliently secured to said tool slide and carrying teeth the pitch of which is greater than the length of the surface to be machined, a work fixture upon which a workpiece can be clamped in fixed relation to said tool slide, and cooperating means on said work fixture and said broach body for reciprocating said body in a plane transverse to the plane of movement of said tool slide in controlled relation to the movement of each successive tooth past a workpiece on said fixture.

2. A machine according to claim 1, wherein said cooperating means comprises a vertically extending cam track on said broach body and cam follower means on said work fixture.

3. A machine according to claim 1, wherein said broach body is provided with a centrally located row of broach teeth extending in the direction of movement of said tool slide and a cam track on each side of and extending parallel to said row of broach teeth and said work fixture is provided with cam follower means for engagement with each cam track.

4. A machine according to claim 3, wherein said cam tracks are provided on the surface of said cam body opposite to that of said teeth, and said cam follower means is provided in forward extensions of said work fixture which extend around the side edges of said broach body.

5. A machine according to claim 4, wherein said cam follower means comprises rollers mounted for rotation about fixed horizontal axes in said forward extensions of said work fixture.

6. A machine according to claim 4, wherein the main body of said work fixture is provided with antifriction means for engagement with the surface of said broach body carrying said broach teeth at points opposite said cam tracks.

7. A machine according to claim 6, wherein said antifriction means comprises rollers rotatably mounted on carriers slidable rearwardly in said work fixture against the action of hydraulic pressure.

8. A machine according to claim 6, wherein those portions of the surface of said broach body engaged by said antifriction means consist of paths extending parallel with said cam tracks and profiled to provide plateau portions coextensive with the teeth on said broach body.

9. A machine according to claim 3, wherein each cam track is profiled to provide a peak in register with each broach tooth and a trough midway between adjacent teeth.

10. A machine according to claim 1, wherein compression springs are interposed between said broach body and a subbase rigidly secured to said tool slide.

11. A machine according to claim 1, wherein a plurality of broach bodies are resiliently secured one above the other to said tool slide and individually reciprocable relative to the tool slide and work fixture during operative movement of said tool slide.

12. A machine according to claim 1, wherein cooperating means are provided on said broach body and said tool slide for maintaining said broach body correctly positioned relative to said workpiece.